United States Patent
Ide et al.

(10) Patent No.: US 8,922,042 B2
(45) Date of Patent: Dec. 30, 2014

(54) CONTROL SYSTEM, METHOD AND PROGRAM, AND FLOATING WIND TURBINE GENERATOR PROVIDED THEREWITH

(71) Applicant: MHI Vestas Offshore Wind A/S, Aarhus N (DK)

(72) Inventors: Kazunari Ide, Tokyo (JP); Takatoshi Matsushita, Tokyo (JP)

(73) Assignee: MHI Vestas Offshore Wind A/S, Aarhus N (DK)

( * ) Notice: Subject to any disclaimer, the term of this patent is extended or adjusted under 35 U.S.C. 154(b) by 80 days.

(21) Appl. No.: 13/775,657

(22) Filed: Feb. 25, 2013

(65) Prior Publication Data
US 2014/0175795 A1    Jun. 26, 2014

Related U.S. Application Data

(63) Continuation of application No. PCT/JP2012/083747, filed on Dec. 26, 2012.

(51) Int. Cl.
*F03D 9/00* (2006.01)

(52) U.S. Cl.
USPC .................................. 290/44; 290/55; 322/22

(58) Field of Classification Search
USPC ........................ 290/43, 44, 54, 55; 322/22, 23
See application file for complete search history.

(56) References Cited

U.S. PATENT DOCUMENTS

| | | | | |
|---|---|---|---|---|
| 7,075,189 B2 * | 7/2006 | Heronemus et al. | ............ | 290/44 |
| 7,452,185 B2 | 11/2008 | Ide et al. | | |
| 7,709,972 B2 * | 5/2010 | Arinaga et al. | ................. | 290/55 |
| 8,022,566 B2 * | 9/2011 | Loh et al. | ......................... | 290/44 |
| 8,026,623 B2 * | 9/2011 | Wakasa et al. | ................... | 290/44 |
| 8,053,916 B2 | 11/2011 | Edwards et al. | | |
| 8,096,762 B2 * | 1/2012 | Risager et al. | ..................... | 416/1 |
| 8,169,099 B2 * | 5/2012 | Roznitsky et al. | .............. | 290/44 |
| 8,395,273 B2 * | 3/2013 | Wakasa et al. | ................... | 290/44 |
| 8,536,722 B1 * | 9/2013 | Wakasa et al. | ................... | 290/44 |

(Continued)

FOREIGN PATENT DOCUMENTS

| | | |
|---|---|---|
| JP | 20082473 A | 1/2008 |
| JP | 2008286156 A | 11/2008 |

(Continued)

OTHER PUBLICATIONS

International Search Report and Written Opinion mailed Apr. 2, 2013, corresponds to PCT/JP2012/083747.

*Primary Examiner* — Nicholas Ponomarenko
(74) *Attorney, Agent, or Firm* — Kanesaka, Berner & Partners

(57) ABSTRACT

The control system of this floating wind turbine generator is a control system of a floating wind turbine generator in which the control system controls a pitch angle control section by a pitch angle instruction value calculated on the basis of signals detected by a second sensor detecting a relative angle between a nacelle and a tower and a third sensor detecting a yaw angle from a reference position of the tower so that a signal detected by a first sensor detecting wind direction deviation relative to a vertical direction of a rotation plane of wind turbine blades indicates an angle within a predetermined range from the vertical direction of the rotation plane of the wind turbine blades, and controls a yaw driving device by a yaw driving instruction value calculated on the basis of the signals detected by the second sensor and the third sensor.

12 Claims, 7 Drawing Sheets

(56) References Cited

U.S. PATENT DOCUMENTS

2010/0003134 A1    1/2010    Edwards et al.
2010/0213712 A1    8/2010    Arinaga et al.
2012/0171034 A1    7/2012    Gabeiras et al.

FOREIGN PATENT DOCUMENTS

JP    201189468 A    5/2011
JP    5031092 B2    9/2012
WO    2009078075 A1    4/2011

* cited by examiner

CONTROL SYSTEM, METHOD AND PROGRAM, AND FLOATING WIND TURBINE GENERATOR PROVIDED THEREWITH

CROSS REFERENCE TO RELATED APPLICATIONS

This is a continuation of International Application PCT/JP2012/83747, with an international filing date of Dec. 26, 2012, which is hereby incorporated by reference herein in its entirety.

TECHNICAL FIELD

The present invention relates to a control system, a method and a program, and a floating wind turbine generator provided therewith.

BACKGROUND ART

Conventionally, there has been a proposed technique in which the direction of the rotation plane of wind turbine blades is controlled to be a direction of receiving wind in a wind turbine generator provided on the sea surface.

For example, Patent Literature 1 below proposes a technique for, in a floating wind turbine generator on the sea surface, detecting a yaw angle of a foundation and a relative angle (yaw angle) between a turbine and a tower, and for controlling a yaw driving device so as to reduce the yaw angle of the foundation.

CITATION LIST

Patent Literature

{PTL 1}
U.S. Pat. No. 8,053,916

SUMMARY OF INVENTION

Technical Problem

However, in the method of the above Patent Literature 1, a control method applied in the case of wind flowing in from a laterally bias direction relative to the rotation plane of wind turbine blades is not described, and it was unable to reduce the wind direction deviation relative to the rotation axis of the wind turbine blades.

The present invention has been made to make an improvement in the above circumstance, and an object of the present invention is to provide a control system, a method and a program capable of efficiently converting wind power to electrical energy in response to wind direction, and a floating wind turbine generator provided therewith.

Solution to Problem

In order to achieve the above object, the present invention provides the following solutions.

A first aspect of the present invention is a control system of a floating wind turbine generator, the floating wind turbine generator comprising: a yaw driving device adapted to cause a nacelle to perform turning in a yaw direction relative to a tower provided with the nacelle at the upper end thereof, the nacelle being provided with a rotor head that rotates by a plurality of wind turbine blades receiving wind power; and a pitch angle control section adapted to drive the wind turbine blades to control a pitch angle thereof, wherein the control system controls the pitch angle control section according to a pitch angle instruction value calculated on the basis of a signal detected by a second sensor for detecting a relative angle between the nacelle and the tower and a signal detected by a third sensor for detecting a yaw angle from a reference position of the tower so as to keep a signal indicating an angle within a predetermined range relative to a vertical direction of a rotation plane of the wind turbine blades, the signal being detected by a first sensor for detecting a wind direction deviation relative to the vertical direction of the rotation plane of the wind turbine blades, and controls the yaw driving device according to a yaw driving instruction value calculated on the basis of the signals detected by the second sensor and the third sensor.

According to such a configuration, a pitch angle control section is controlled according to a pitch angle instruction value calculated on the basis of a signal detected by a second sensor for detecting a relative angle between a nacelle and a tower and a signal detected by a third sensor for detecting a yaw angle from a reference position of the tower so as to keep a signal indicating an angle within a predetermined range from the vertical direction of a rotation plane of the wind turbine blades, and the signal is detected by a first sensor for detecting a wind direction deviation relative to a vertical direction of the rotation plane of wind turbine blades, and a yaw driving device is controlled according to a yaw driving instruction value calculated on the basis of the signals detected by the second sensor and the third sensor.

By combining the yaw driving device and the pitch angle control of the wind turbine blades to perform yaw angle control of the rotation plane of the wind turbine blades, it is possible to suppress misalignment between the rotation plane of the wind turbine blades and wind direction to be small and efficiently convert wind power to electrical energy.

A second aspect of the present invention is a control system of a floating wind turbine generator, the floating wind turbine generator comprising a pitch angle control section adapted to drive a plurality of wind turbine blades to control a pitch angle of each of the wind turbine blades, and having a tilt angle, which is an angle between a horizontal plane and a main shaft, wherein the control system controls the pitch angle control section according to a pitch angle instruction value for controlling the pitch angle of each of the wind turbine blades so as to keep a signal indicating an angle within a predetermined range, the signal being detected by a fourth sensor for detecting a turbine pitch angle, which is an angle between a vertical axis of the horizontal plane and a tower provided with a nacelle at the upper end of the tower, the nacelle being provided with a rotor head that rotates by the wind turbine blades receiving wind power.

According to such a configuration, the pitch angle of each of the wind turbine blades is controlled according to a pitch angle instruction value so as to keep a signal indicating an angle within a predetermined range, the signal being detected by a fourth sensor for detecting a turbine pitch angle, which is an angle between a vertical axis of the horizontal plane and a tower provided with a nacelle at the upper end of the tower, the nacelle being provided with a rotor head that rotates by the wind turbine blades receiving wind power.

In the case of suppressing misalignment between the rotation plane of the wind turbine blades and wind direction by moving the pitch angles of each of the wind turbine blades independently and generating the moment, as described above, it is possible to efficiently convert wind power to electrical energy.

A floating wind turbine generator to which the above control system is applied may be provided with a foundation with a floating structure that floats on the sea surface and the tower installed on the foundation.

It is presumed that, since the wind turbine blades receive wind, and force is imposed on the rotor connected to the wind turbine blades, the foundation on which the tower is installed turns even if the nacelle is rotated by the yaw driving device. However, according to the control system of the present invention, it is possible to perform control to accurately and efficiently convert wind power to electrical energy by considering the inertia of the rotor and the inertia of the tower and the floating body.

The floating wind turbine generator to which the above control system is applied may be provided with a tower floating on the sea surface.

In the case of a spar-type floating wind turbine generator without a foundation, it is inferior from the viewpoint of stability to a floating wind turbine generator having a foundation. However, according to the control system of each of the above aspects, even the spar-type floating wind turbine generator can be controlled to efficiently convert wind power to electrical energy.

A third aspect of the present invention is a wind farm comprising the control system according to any of the above aspects and a floating wind turbine generator.

A fourth aspect of the present invention is a control method for a floating wind turbine generator, the floating wind turbine generator comprising: a yaw driving device adapted to cause a nacelle to perform turning in a yaw direction relative to a tower provided with the nacelle at the upper end thereof, the nacelle being provided with a rotor head that rotates by a plurality of wind turbine blades receiving wind power; and a pitch angle control section adapted to drive the wind turbine blades to control a pitch angle thereof, the control method comprising: controlling the pitch angle control section according to a pitch angle instruction value calculated on the basis of a signal detected by a second sensor for detecting a relative angle between the nacelle and the tower and a signal detected by a third sensor for detecting a yaw angle from a reference position of the tower so as to keep a signal indicating an angle within a predetermined range relative to a vertical direction of a rotation plane of the wind turbine blades, the signal being detected by a first sensor for detecting a wind direction deviation relative to the vertical direction of the rotation plane of the wind turbine blades; and controlling the yaw driving device according to a yaw driving instruction value calculated on the basis of the signals detected by the second sensor and the third sensor.

A fifth aspect of the present invention provides a control program for a floating wind turbine generator, the floating wind turbine generator comprising: a yaw driving device adapted to cause a nacelle to perform turning in a yaw direction relative to a tower provided with the nacelle at the upper end thereof, the nacelle being provided with a rotor head that rotates by a plurality of wind turbine blades receiving wind power; and a pitch angle control section adapted to drive the wind turbine blades to control a pitch angle thereof, wherein the control program controls the pitch angle control section according to a pitch angle instruction value calculated on the basis of a signal detected by a second sensor for detecting a relative angle between the nacelle and the tower and a signal detected by a third sensor for detecting a yaw angle from a reference position of the tower so as to keep a signal indicating an angle within a predetermined range relative to a vertical direction of a rotation plane of the wind turbine blades, the signal being detected by a first sensor for detecting a wind direction deviation relative to the vertical direction of the rotation plane of the wind turbine blades, and controls the yaw driving device according to a yaw driving instruction value calculated on the basis of the signals detected by the second sensor and the third sensor.

A sixth aspect of the present invention is a control method for a floating wind turbine generator, the floating wind turbine generator comprising a pitch angle control section adapted to drive a plurality of wind turbine blades to control a pitch angle of each of the wind turbine blades, and having a tilt angle, which is an angle between a horizontal plane and a main shaft, the control method comprising: controlling the pitch angle control section according to a pitch angle instruction value for controlling the pitch angle of each of the wind turbine blades so as to keep a signal indicating an angle within a predetermined range, the signal being detected by a fourth sensor for detecting a turbine pitch angle, which is an angle between a vertical axis of the horizontal plane and a tower provided with a nacelle at the upper end of the tower, the nacelle being provided with a rotor head that rotates by the wind turbine blades receiving wind power.

A seventh aspect of the present invention is a control program for a floating wind turbine generator, the floating wind turbine generator comprising a pitch angle control section adapted to drive a plurality of wind turbine blades to control a pitch angle of each of the wind turbine blades, and having a tilt angle, which is an angle between a horizontal plane and a main shaft, wherein the control program controls the pitch angle control section according to a pitch angle instruction value for controlling the pitch angle of each of the wind turbine blades so as to keep a signal indicating an angle within a predetermined range, the signal being detected by a fourth sensor for detecting a turbine pitch angle, which is an angle between a vertical axis of the horizontal plane and a tower provided with a nacelle at the upper end of the tower, the nacelle being provided with a rotor head that rotates by the wind turbine blades receiving wind power.

Advantageous Effects of Invention

According to the present invention, an advantage to efficiently convert wind power to electrical energy according to wind direction can be achieved.

DESCRIPTION OF EMBODIMENTS

Embodiments of a control system, method and program, and a floating wind turbine generator provided therewith according to the present invention will be described below with reference to drawings.

First Embodiment

Figure 1:
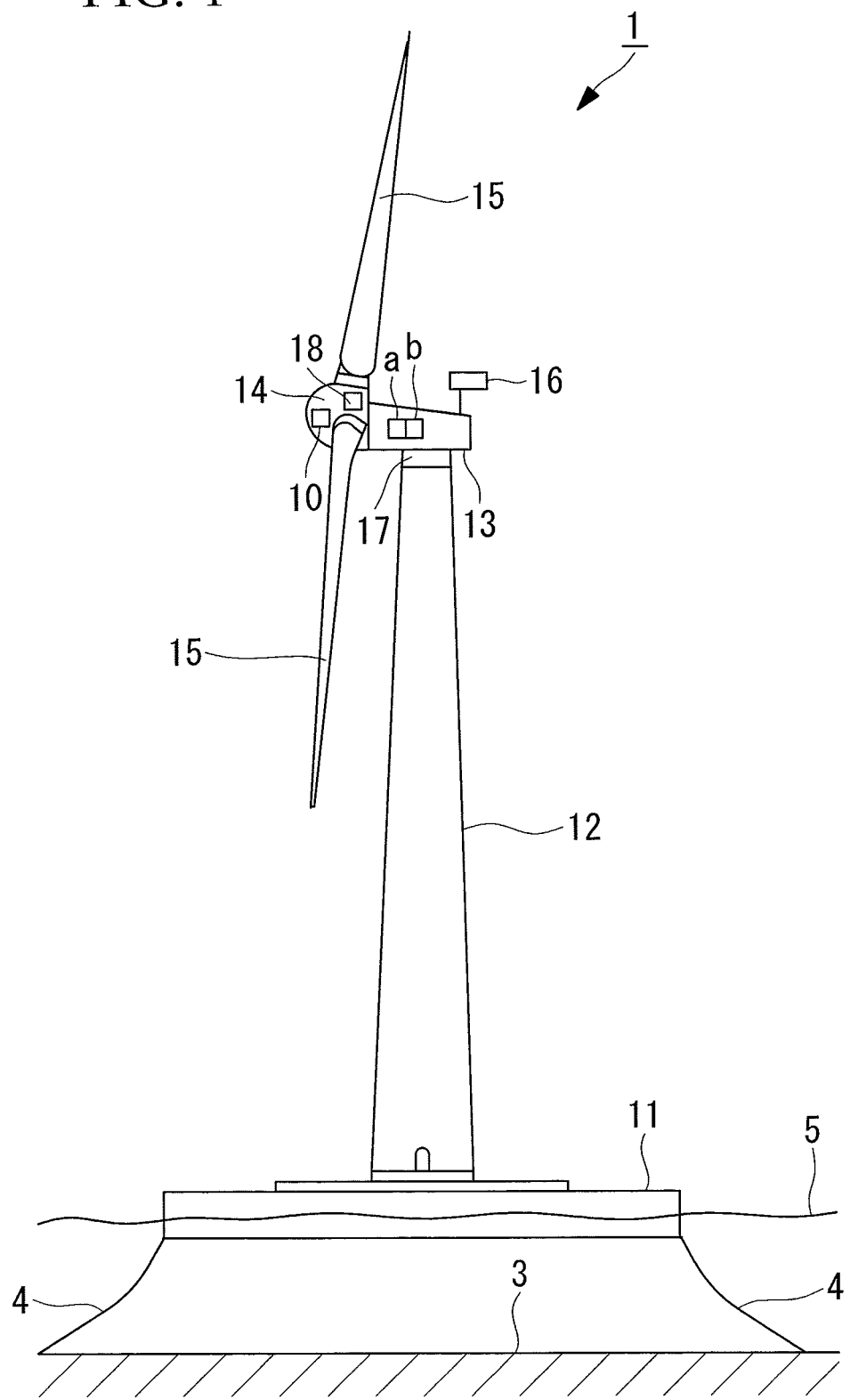
FIG. 1 is a diagram showing a schematic configuration of a floating wind turbine generator according to a first embodiment of the present invention.

FIG. 1 is a diagram showing a schematic configuration of a wind turbine (floating wind turbine generator) 1 according to a first embodiment of the present invention.

As shown in FIG. 1, the wind turbine 1 has a foundation 11 with a floating structure that floats on a sea surface 5, a tower 12 installed on the foundation, a nacelle 13 installed at the upper end of the tower 12, a rotor head 14 provided on the nacelle 13 such that it can rotate around a substantially horizontal axis, a yaw driving device 17, a pitch angle control section 18, an anemovane (first sensor) 16, a second sensor a, a third sensor b and a control system 10. The foundation 11 is connected to a sea bottom 3 via a mooring cable 4. The rotor head 14 is attached with three wind turbine blades 15 radially around the rotation axis thereof. Thereby, the wind power blowing against the wind turbine blades 15 from the direction of the rotation axis of the rotor head 14 is converted to power which causes the rotor head 14 to rotate around the rotation axis, and the power is converted to electrical energy by power generation facilities (not shown) provided for the wind turbine 1. A plane formed by the wind turbine blades 15 when the wind turbine blades 15 rotate around the rotation axis is referred to as a rotation plane of the wind turbine blades 15.

The rotor head 14 is provided with the control system 10 which controls the pitch angle and the like of the wind turbine blades 15 by rotating the wind turbine blades 15 around the axis of the wind turbine blades 15 according to wind conditions to control operation of the wind turbine 1. The nacelle 13 is provided with the anemovane 16. The anemovane 16 measures wind speed and wind direction deviation relative to the vertical direction of the rotation plane of the wind turbine blades to output the measurement results to the control system 10.

The yaw driving device 17 is provided at a connection part between the tower 12 and the nacelle 13. The yaw driving device 17 causes the nacelle 13 to perform turning in a yaw direction on the basis of a yaw driving instruction value acquired from the control system 10. The pitch angle control section 18 controls the pitch angle of each of the three wind turbine blades 15 attached to the rotor head 14.

Although a wind turbine provided with three wind turbine blades 15 is described as an example in the present embodiment, the number of the wind turbine blades 15 is not limited to three. Two or more than three wind turbine blades may be attached. The number is not especially limited.

The second sensor a detects a relative angle between the nacelle 13 and the tower 12.

The third sensor b detects a yaw angle from a reference position of the tower 12. Since the tower 12 is provided on the foundation 11 in the present embodiment, the third sensor b detects the yaw angle from the reference position of the foundation 11 as a foundation yaw angle.

Figure 2:
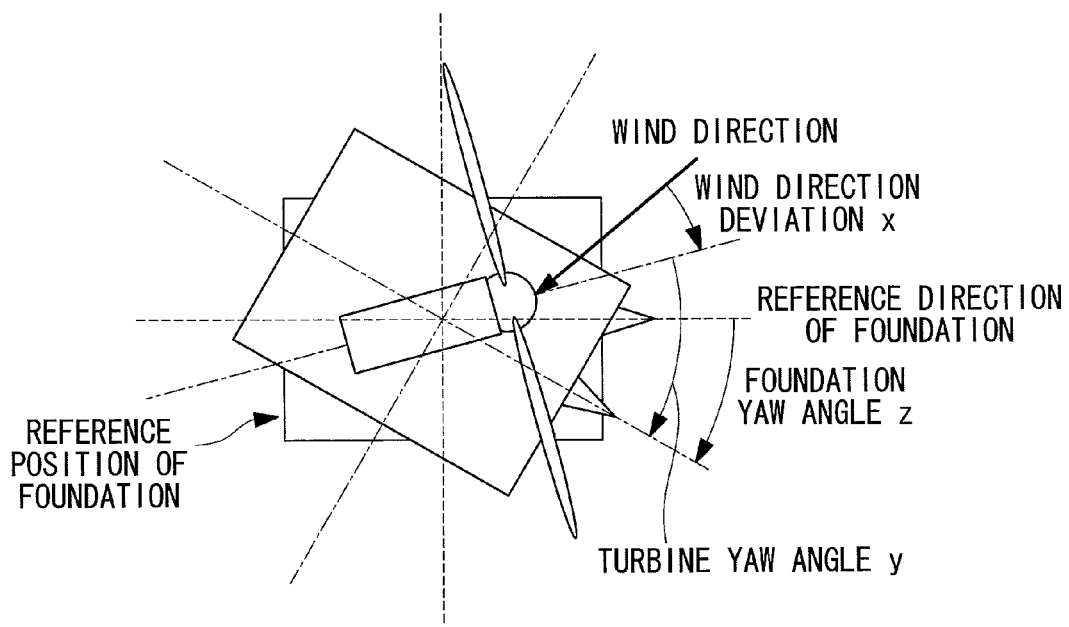
FIG. 2 shows a top view of the floating wind turbine generator according to the first embodiment.

Here, FIG. 2 shows a top view of the wind turbine 1 according to the present embodiment.

When the right side of FIG. 2 is assumed to be the reference position (reference direction) of the foundation 11, deviation of the foundation 11 from the reference position is detected as a foundation yaw angle z from the reference position of the tower 12 (the third sensor b). The misalignment between the rotation axis of the rotor head 14 and wind direction is detected as a wind direction deviation x (the anemovane 16). The relative angle between the nacelle 13 and the tower 12 is detected as a turbine yaw angle y on the basis of deviation between the rotation axis of the rotor head 14 and the reference position of the foundation 11 (the second sensor a).

Figure 3:
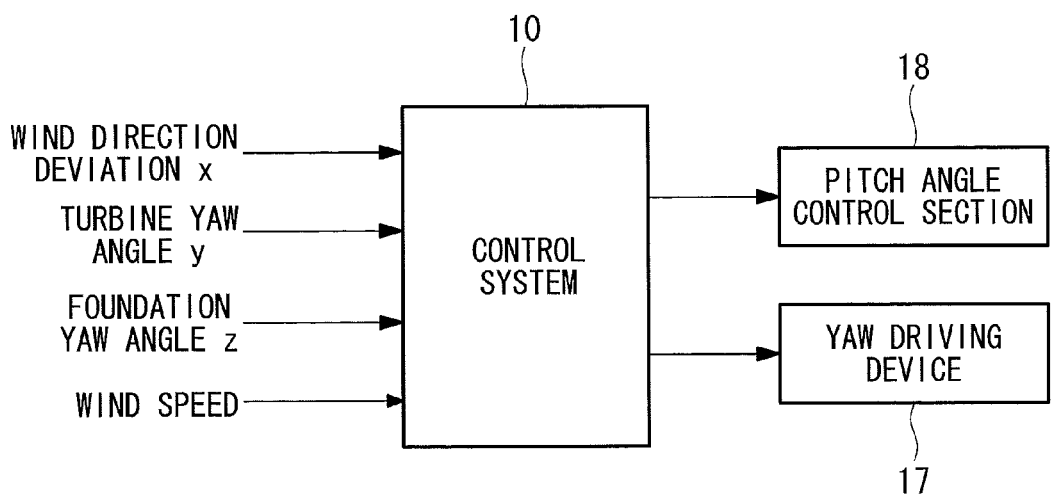
FIG. 3 shows a function block diagram of a control system according to the first embodiment.

As shown in FIG. 3, the control system 10 determines a pitch angle instruction value for driving each of the three wind turbine blades 15 and a yaw driving instruction value, on the basis of the wind direction deviation x, the turbine yaw angle y, the foundation yaw angle z and information about wind speed. More specifically, the control system 10 controls the pitch angle control section 18 by the pitch angle instruction value calculated on the basis of a signal (the turbine yaw angle y) detected by the second sensor a and a signal (the foundation yaw angle z) detected by the third sensor b so that a signal (the wind direction deviation x) detected by the anemovane 16 indicates an angle within a predetermined range from the vertical direction of the rotation plane of the wind turbine blades 15, and controls the yaw driving device 17 by the yaw driving instruction value calculated on the basis of signals detected by the second sensor a and the third sensor b. The angle within the predetermined range is preferably within a range of about 0° from the rotation axis direction of the wind turbine blades 15, and, more preferably, is the rotation axis direction (that is, 0°). In other words, the control system 10 outputs such a pitch angle instruction value that causes the rotation plane of the wind turbine blades 15 to face to wind direction and such a yaw driving instruction value that causes the tower 12 to face to the reference position direction.

Next, operation of the wind turbine generator system 1 according to the present embodiment will be described with reference to FIGS. 1 to 4.

Figure 4:
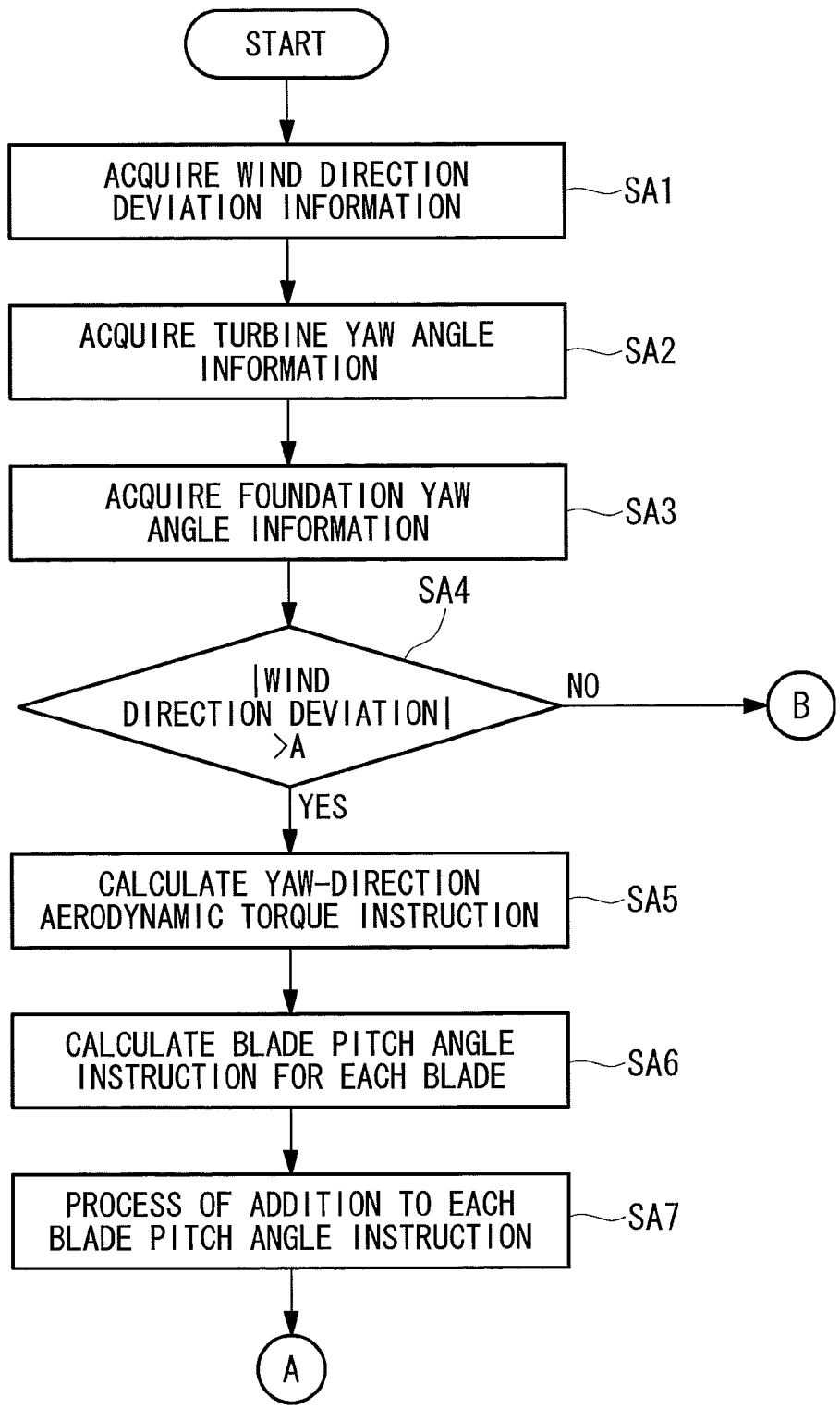
FIG. 4 shows an operation flow of the control system according to the first embodiment.

When wind blows against the wind turbine blades 15 from the direction of the rotation axis of the rotor head 14, the wind direction deviation x from the rotation axis is detected by the anemovane 16 and is outputted to the control system 10 (step SA1 in FIG. 4). A relative angle between the nacelle 13 and the tower 12 is detected by the second sensor a as the turbine yaw angle y and is outputted to the control system 10 (step SA2 in FIG. 4). The foundation yaw angle z is detected by the third sensor b and outputted to the control system 10 (step SA3 in FIG. 4). It is judged whether the wind direction deviation x is an angle larger than a predetermined range A from the vertical direction of the rotation plane of the wind turbine blades 15 (the direction of the rotation axis of the rotor head 14) (step SA4 in FIG. 4). If the wind direction deviation x is judged to be an angle within the predetermined range, a yaw driving device stopping instruction to stop the yaw driving device is outputted (step SA 11 in FIG. 5), and the flow proceeds to step SA9 in FIG. 5.

If the wind direction deviation x is judged to be an angle larger than the predetermined range A from the vertical direction of the rotation plane of the wind turbine blades 15, a yaw-direction aerodynamic torque instruction for causing the wind direction deviation x to be within the predetermined range is calculated (step SA5 in FIG. 4). Furthermore, a pitch angle instruction value θ' for each wind turbine blade 15 for causing the wind direction deviation x to be within the predetermined range is calculated (step SA6 in FIG. 4). Information about the pitch angle instruction value θ' for each wind turbine blade 15 for causing the wind direction deviation x to be within the predetermined range is added to a pitch angle instruction value θt which is determined from a pitch angle target value determined on the basis of wind speed and output power (step SA7 in FIG. 5), and a pitch angle instruction value θ for driving the pitch angle control section 18 is determined.

Figure 5:
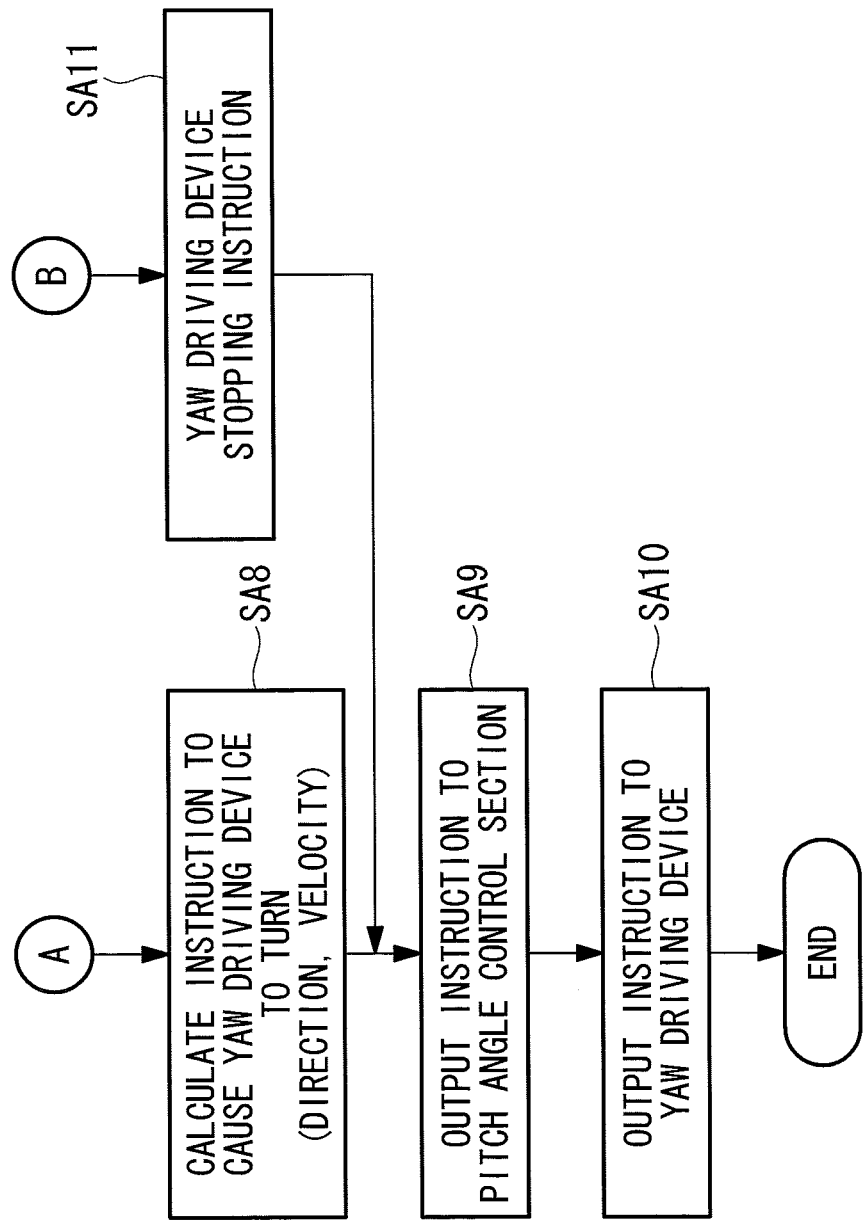
FIG. 5 shows the continuation of the operation flow of the control system according to the first embodiment.

The yaw driving instruction value (for example, direction, velocity and the like) for the yaw driving device 17 determined on the basis of the yaw-direction aerodynamic torque instruction is calculated (step SA8 in FIG. 5). The pitch angle instruction value θ is outputted to the pitch angle control section 18 (step SA9 in FIG. 5), the yaw driving instruction value is outputted to the yaw driving device 17 (step SA 10 in FIG. 5), and the process ends.

The pitch angle control section 18 controls the pitch angle of each wind turbine blade 15 on the basis of the pitch angle instruction value θ, and the yaw driving device 17 causes the nacelle 13 to turn on the basis of the yaw driving instruction value.

As described above, according to the control system 10, the method, the program and the wind turbine 1 (floating wind turbine generator) provided therewith according to the present embodiment, the pitch angle control section is controlled by the pitch angle instruction value calculated on the basis of a signal detected by the second sensor a which detects the turbine yaw angle y, which is a relative angle between the nacelle 13 and the tower 12, and a signal detected by the third sensor b which detects the foundation yaw angle z from the reference position of the tower 12 so that a signal detected by the anemovane 16 which detects the wind direction deviation x relative to the vertical direction of the rotation plane of the wind turbine blades 15 indicates the vertical direction of the rotation plane of the wind turbine blades 15 (the wind direction deviation relative to the rotation axis is 0°), and the yaw driving device is controlled by the yaw driving instruction value calculated on the basis of the signals detected by the second sensor a and the third sensor b.

As described above, the yaw control by the yaw driving device and the pitch angle control of the wind turbine blades 15 are combined to generate a rotation torque in the yaw direction and control the yaw angle of the rotation plane of the wind turbine blades 15. Thereby, even in the case where the tower 12 is not fixed to the sea bottom or the like, and where the tower 12 turns with the foundation 11 even if the yaw driving device performs yaw control, like a floating wind turbine generator, it is possible to suppress misalignment between the rotation plane of the wind turbine blades 15 and wind direction and efficiently convert wind power to electrical energy.

Although, in the present embodiment, description has been made on the assumption that the tower 12 of the wind turbine 1 is provided on the foundation 11, the present invention is not limited thereto and can be applied to a spar-type floating wind turbine generator which is not provided with the foundation 11. Since, in the spar-type floating wind turbine generator, the tower 12 turns more easily when yaw control is performed, it is possible to cause the rotation plane of the wind turbine blades of the spar-type floating generator to face to wind direction more certainly by applying the present invention.

Second Embodiment

Next, a second embodiment of the present invention will be described with reference to FIG. 6.

A control system of a floating wind turbine generator according to the present embodiment is different from the first embodiment in that its wind turbine blades have a tilt angle. Description will be made below mainly on points of difference of the control system of the present embodiment from the first embodiment, with description about points common to the first embodiment being omitted.

Figure 6:
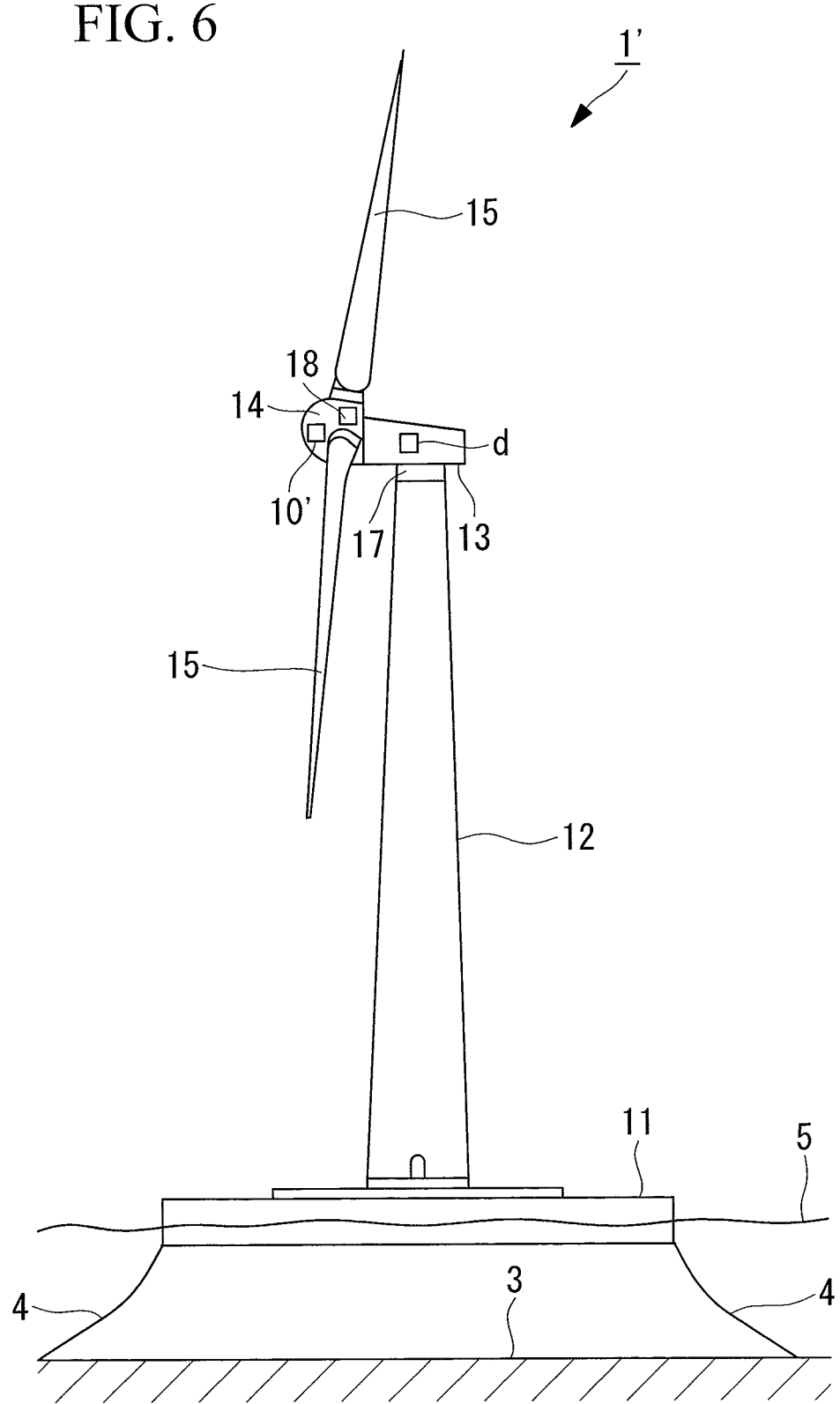
FIG. 6 is a diagram showing a schematic configuration of a floating wind turbine generator according to a second embodiment of the present invention.

FIG. 6 shows a schematic configuration of a wind turbine (floating wind turbine generator) 1' according to the present embodiment.

Figure 7:
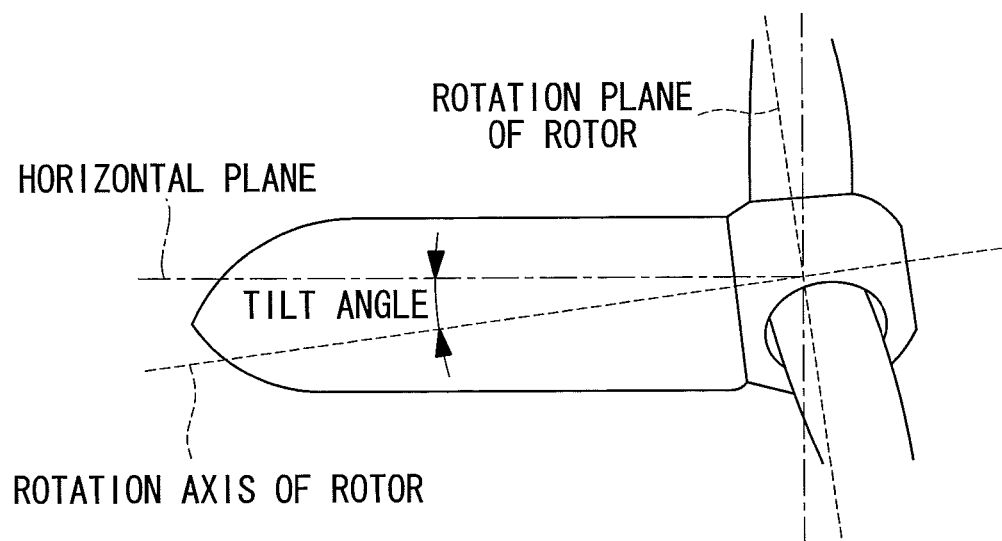
FIG. 7 is a diagram for illustrating a tilt angle.

As shown in FIG. 6, the wind turbine 1' has a foundation 11 with a floating structure that floats on the sea surface, a tower 12 installed on the foundation, a nacelle 13 installed at the upper end of the tower 12, a rotor head 14 provided on the nacelle 13 such that it can rotate around a substantially horizontal axis, a pitch angle control section 18, a fourth sensor d and a control system 10'. The foundation 11 is connected to a sea bottom 3 via a mooring cable 4. The rotor head 14 is attached with three wind turbine blades 15 radially around the rotation axis thereof. Thereby, the wind power blowing against the wind turbine blades 15 from the direction of the rotation axis of the rotor head 14 is converted to power which causes the rotor head 14 to rotate around the rotation axis, and the power is converted to electrical energy by power generation facilities (not shown) provided for the wind turbine 1. A plane formed by the wind turbine blades 15 when the wind turbine blades 15 rotate around the rotation axis is referred to as a rotation plane of the wind turbine blades 15. As shown in FIG. 7, the wind turbine 1' according to the present embodiment has a tilt angle (for example, 5°), which is an angle between a horizontal plane and the rotation axis of the rotor head 14, and the rotation plane is directed upward by an angle corresponding to the tilt angle.

The control system 10' controls the pitch angle control section 18 by a pitch angle instruction value which controls the pitch angle of each wind turbine blade 15 so that a signal detected by the fourth sensor d which detects a turbine pitch angle, which is an angle between the vertical axis relative to the horizontal plane and the tower 12, indicates an angle in a predetermined range. The angle in the predetermined range is preferably such that the turbine pitch angle between the vertical axis relative to the horizontal plane and the rotation plane of the wind turbine blades 15 of the tower 12 is equal to the tilt angle, that is, it is equivalent to a situation where the rotation axis of the rotor head 14 is horizontal.

Next, operation of a wind turbine generator system 1 according to the present embodiment will be described with reference to FIG. 8.

Figure 8:
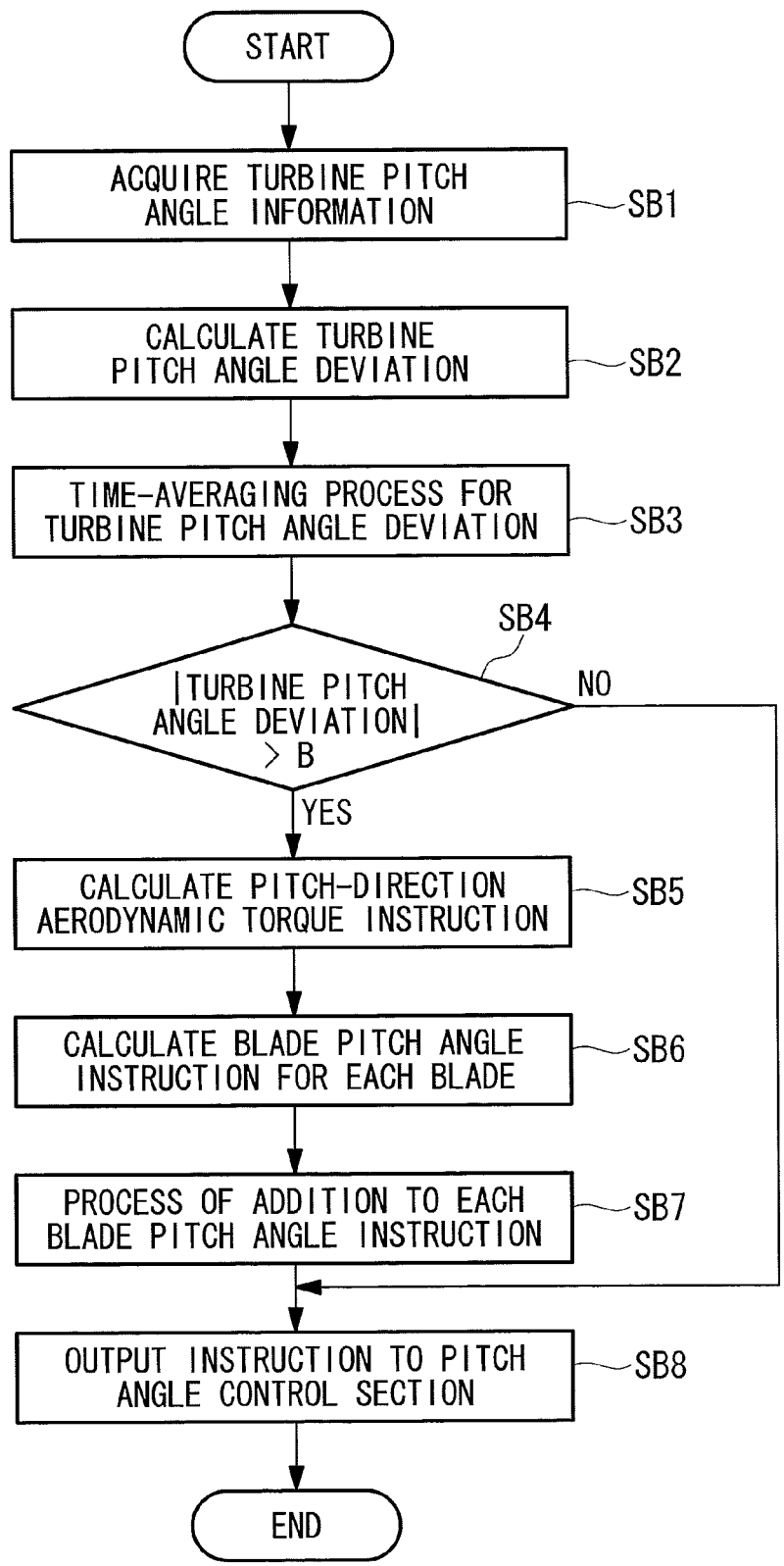
FIG. 8 shows an operation flow of the control system according to the second embodiment.

When wind blows against the wind turbine blades 15 from the direction of the rotation axis of the rotor head 14, a turbine pitch angle, which is an angle between the vertical axis relative to the horizontal plane and the tower 12, is detected by the fourth sensor (step SB1 in FIG. 8). A turbine pitch angle deviation, which is deviation between a turbine pitch angle with which wind can be received most efficiently and the detected turbine pitch angle, is estimated (step SB2 in FIG. 8), and a time-averaging process for the turbine pitch angle deviation is performed (step SB3 in FIG. 8). It is judged whether the turbine pitch angle deviation after the time-averaging process is larger than a predetermined range B or not (step SB4 in FIG. 8). If the turbine pitch angle deviation is judged to be equal to or smaller than the predetermined range, the flow proceeds to step SB8 in FIG. 8.

If the turbine pitch angle deviation is judged to be larger than the predetermined range B, a pitch-direction aerodynamic torque instruction for causing the turbine pitch angle deviation to be an angle within the predetermined range is calculated (step SB5 in FIG. 8). Furthermore, a pitch angle instruction value θ' for each wind turbine blade 15 is calculated on the basis of the pitch-direction aerodynamic torque instruction (step SB6 in FIG. 8). Information about the pitch angle instruction value θ' for each wind turbine blade 15 for causing the turbine pitch angle deviation to be within the predetermined range is added to a pitch angle instruction value θt determined from a pitch angle target value, which is determined on the basis of wind speed and output (step SB7 in FIG. 8), and a pitch angle instruction value θ for driving the pitch angle control section 18 is determined. The pitch angle instruction value θ is outputted to the pitch angle control section 18 (step SB8 in FIG. 8), and the process ends.

As described above, according to the control system 10, the method and the program, the wind turbine (floating wind turbine generator) 1' provided therewith, according to the present embodiment, the pitch angle of each wind turbine blade 15 is controlled by a pitch angle instruction value so that a signal detected by the fourth sensor which detects a turbine pitch angle, which is an angle between the vertical axis relative to horizontal plane and the tower 12 indicates an angle within a predetermined range.

By moving the pitch angle of each of the wind turbine blades 15 independently and generating the moment to suppress deviation between the rotation plane of the wind turbine blades 15 and wind direction, it is possible to efficiently convert wind power to electrical energy.

{Reference Signs List}
1, 1' wind turbine
10, 10' control system
16 anemovane (first sensor)
17 yaw driving device
18 pitch angle control section
a second sensor
b third sensor
d fourth sensor

The invention claimed is:

1. A control system of a floating wind turbine generator, the floating wind turbine generator comprising: a yaw driving device adapted to cause a nacelle to perform turning in a yaw direction relative to a tower provided with the nacelle at the upper end thereof, the nacelle being provided with a rotor head that rotates by a plurality of wind turbine blades receiving wind power; and a pitch angle control section adapted to drive the wind turbine blades to control a pitch angle thereof, wherein
the control system controls the pitch angle control section according to a pitch angle instruction value calculated on the basis of a signal detected by a second sensor for detecting a relative angle between the nacelle and the tower and a signal detected by a third sensor for detecting a yaw angle from a reference position of the tower so as to keep a signal indicating an angle within a predetermined range relative to a vertical direction of a rotation plane of the wind turbine blades, the signal being detected by a first sensor for detecting a wind direction deviation relative to the vertical direction of the rotation plane of the wind turbine blades, and controls the yaw driving device according to a yaw driving instruction value calculated on the basis of the signals detected by the second sensor and the third sensor.

2. The control system of the floating wind turbine generator according to claim 1, wherein the floating wind turbine generator comprises a foundation with a floating structure that floats on a sea surface and the tower installed on the foundation.

3. The control system of the floating wind turbine generator according to claim 1, wherein the floating wind turbine generator comprises the tower floating on a sea surface.

4. A wind farm comprising the control system according to claim 1, and a floating wind turbine generator.

5. A control system of a floating wind turbine generator, the floating wind turbine generator comprising a pitch angle control section adapted to drive a plurality of wind turbine blades to control a pitch angle of each of the wind turbine blades, and having a tilt angle, which is an angle between a horizontal plane and a main shaft, wherein
the control system controls the pitch angle control section according to a pitch angle instruction value for controlling the pitch angle of each of the wind turbine blades so as to keep a signal indicating an angle within a predetermined range, the signal being detected by a fourth sensor for detecting a turbine pitch angle, which is an angle between a vertical axis of the horizontal plane and a tower provided with a nacelle at the upper end of the tower, the nacelle being provided with a rotor head that rotates by the wind turbine blades receiving wind power.

6. The control system of the floating wind turbine generator according to claim 5, wherein the floating wind turbine generator comprises a foundation with a floating structure that floats on a sea surface and the tower installed on the foundation.

7. The control system of the floating wind turbine generator according to claim 5, wherein the floating wind turbine generator comprises the tower floating on a sea surface.

8. A wind farm comprising the control system according to claim 5, and a floating wind turbine generator.

9. A control method for a floating wind turbine generator, the floating wind turbine generator comprising: a yaw driving device adapted to cause a nacelle to perform turning in a yaw direction relative to a tower provided with the nacelle at the upper end thereof, the nacelle being provided with a rotor head that rotates by a plurality of wind turbine blades receiving wind power; and a pitch angle control section adapted to drive the wind turbine blades to control a pitch angle thereof, the control method comprising:
controlling the pitch angle control section according to a pitch angle instruction value calculated on the basis of a signal detected by a second sensor for detecting a relative angle between the nacelle and the tower and a signal detected by a third sensor for detecting a yaw angle from a reference position of the tower so as to keep a signal indicating an angle within a predetermined range relative to a vertical direction of a rotation plane of the wind turbine blades, the signal being detected by a first sensor for detecting a wing direction deviation relative to the vertical direction of the rotation plane of the wind turbine blades; and controlling the yaw driving device according to a yaw driving instruction value calculated on the basis of the signals detected by the second sensor and the third sensor.

10. A control program for a floating wind turbine generator, the floating wind turbine generator comprising: a yaw driving device adapted to cause a nacelle to perform turning in a yaw direction relative to a tower provided with the nacelle at the upper end thereof, the nacelle being provided with a rotor head that rotates by a plurality of wind turbine blades receiving wind power; and a pitch angle control section adapted to drive the wind turbine blades to control a pitch angle thereof, wherein
the control program controls the pitch angle control section according to a pitch angle instruction value calculated on the basis of a signal detected by a second sensor for detecting a relative angle between the nacelle and the tower and a signal detected by a third sensor for detecting a yaw angle from a reference position of the tower so as to keep a signal indicating an angle within a predetermined range relative to a vertical direction of a rotation plane of the wind turbine blades, the signal being detected by a first sensor for detecting a wind direction deviation relative to the vertical direction of the rotation plane of the wind turbine blades, and controls the yaw driving device according to a yaw driving instruction value calculated on the basis of the signals detected by the second sensor and the third sensor.

11. A control method for a floating wind turbine generator, the floating wind turbine generator comprising a pitch angle control section adapted to drive a plurality of wind turbine blades to control a pitch angle of each of the wind turbine blades, and having a tilt angle, which is an angle between a horizontal plane and a main shaft, the control method comprising: controlling the pitch angle control section according to a pitch angle instruction value for controlling the pitch angle of each of the wind turbine blades so as to keep a signal indicating an angle within a predetermined range, the signal being detected by a fourth sensor for detecting a turbine pitch angle, which is an angle between a vertical axis of the horizontal plane and a tower provided with a nacelle at the upper end of the tower, the nacelle being provided with a rotor head that rotates by the wind turbine blades receiving wind power.

12. A control program for a floating wind turbine generator, the floating wind turbine generator comprising a pitch angle control section adapted to drive a plurality of wind turbine blades to control a pitch angle of each of the wind turbine blades, and having a tilt angle, which is an angle between a horizontal plane and a main shaft, wherein the control program controls the pitch angle control section according to a pitch angle instruction value for controlling the pitch angle of each of the wind turbine blades so as to keep a signal indicating an angle within a predetermined range, the signal being detected by a fourth sensor for detecting a turbine pitch angle, which is an angle between a vertical axis of the horizontal plane and a tower provided with a nacelle at the upper end of the tower, the nacelle being provided with a rotor head that rotates by the wind turbine blades receiving wind power.

\* \* \* \* \*